United States Patent
Mariyani et al.

(10) Patent No.: US 11,700,516 B2
(45) Date of Patent: Jul. 11, 2023

(54) SERVICE MODIFICATION IN WIRELESS COMMUNICATION NETWORKS

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 34 days.

(21) Appl. No.: 17/332,168

(22) Filed: May 27, 2021

(65) Prior Publication Data

US 2022/0386096 A1 Dec. 1, 2022

(51) Int. Cl.
*H04W 4/50* (2018.01)
*H04W 8/02* (2009.01)

(52) U.S. Cl.
CPC ............... *H04W 4/50* (2018.02); *H04W 8/02* (2013.01)

(58) Field of Classification Search
CPC ........... H04W 4/50; H04W 8/02; H04W 8/18; Y02D 30/70
See application file for complete search history.

(56) References Cited

U.S. PATENT DOCUMENTS

| | | | |
|---|---|---|---|
| 10,057,777 B2 | 8/2018 | Li et al. | |
| 10,142,994 B2 | 11/2018 | Lee et al. | |
| 10,313,887 B2 | 6/2019 | Vrzic et al. | |
| 10,412,741 B2 | 9/2019 | Lee et al. | |
| 2017/0332421 A1 | 11/2017 | Sternberg et al. | |
| 2019/0182752 A1 | 6/2019 | Lou et al. | |
| 2020/0112907 A1* | 4/2020 | Dao | H04M 15/8016 |
| 2021/0014766 A1 | 1/2021 | Liu | |
| 2022/0201593 A1* | 6/2022 | Baek | H04W 60/00 |

OTHER PUBLICATIONS

"Smart, efficient, and dynamic end-to-end 5G network slicing management"; amdocs; 2020; pp. 1-12; amdocs.com.

(Continued)

*Primary Examiner* — Joseph E Dean, Jr.

(57) ABSTRACT

A wireless communication network serves a wireless data service to a wireless User Equipment (UE). In the wireless communication network, a network controller receives a service request from the wireless UE. The network controller responsively indicates the service request to a Unified Data Management (UDM). The UDM receives the indication. The UDM identifies provisioned service values for the wireless UE. The UDM retrieves updated service values for the wireless UE. The UDM identifies a set of the provisioned service values that correspond to the updated service values. The UDM generates new provisioned service values by overriding the set of the provisioned service values based on the updated service values. The UDM transfers new provisioned service values to the network controller. The network controller receives the new provisioned service values. The network controller serves the wireless UE based on the new provisioned service values.

20 Claims, 10 Drawing Sheets

(56) References Cited

OTHER PUBLICATIONS

"3rd Generation Partnership Project; Technical Specification Group Services and System Aspects; Procedures for the 5G System (5GS); Stage 2 (Release 17)"; 3GPP TS 23.502; Mar. 2021; pp. 1-646; V17.0.0; 3GPP; Sophia Antipolis, France.

"3rd Generation Partnership Project; Technical Specification Group Core Network and Terminals; 5G System; Unified Data Management Services; Stage 3 (Release 17)"; 3GPP TS 29.503; Mar. 2021; pp. 1-377; V17.2.0; 3GPP; Sophia Antipolis, France.

\* cited by examiner

SERVICE MODIFICATION IN WIRELESS COMMUNICATION NETWORKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMF), Unified Data Management (UDM), and Unified Data Repository (UDR).

In a wireless network core, the AMF interacts with the UDM to provide wireless data services for the wireless user device. The UDM retrieves user context for the wireless user device from the UDR. The user context indicates various service parameters like Data Network Names (DNNs) and Quality-of-Service (QoS). The UDM transfers the user context to the AMF. The AMF uses the user context to establish the wireless data service for the wireless user device. Some of the service parameters in the user context are rigid and difficult to update. Unfortunately, the UDM does not efficiently retrieve and transfer user context for the wireless user device. Moreover, the UDM does not effectively respond to network requirements in the wireless communications network.

TECHNICAL OVERVIEW

A wireless communication network serves a wireless data service to a wireless User Equipment (UE). In the wireless communication network, a network controller receives a service request from the wireless UE. The network controller responsively indicates the service request to a Unified Data Management (UDM). The UDM receives the indication. The UDM identifies provisioned service values for the wireless UE. The UDM retrieves updated service values for the wireless UE. The UDM identifies a set of the provisioned service values that correspond to the updated service values. The UDM generates new provisioned service values by overriding the set of the provisioned service values based on the updated service values. The UDM transfers the new provisioned service values to the network controller. The network controller receives the new provisioned service values. The network controller serves the wireless UE based on the new provisioned service values.

DETAILED DESCRIPTION

Figure 1:
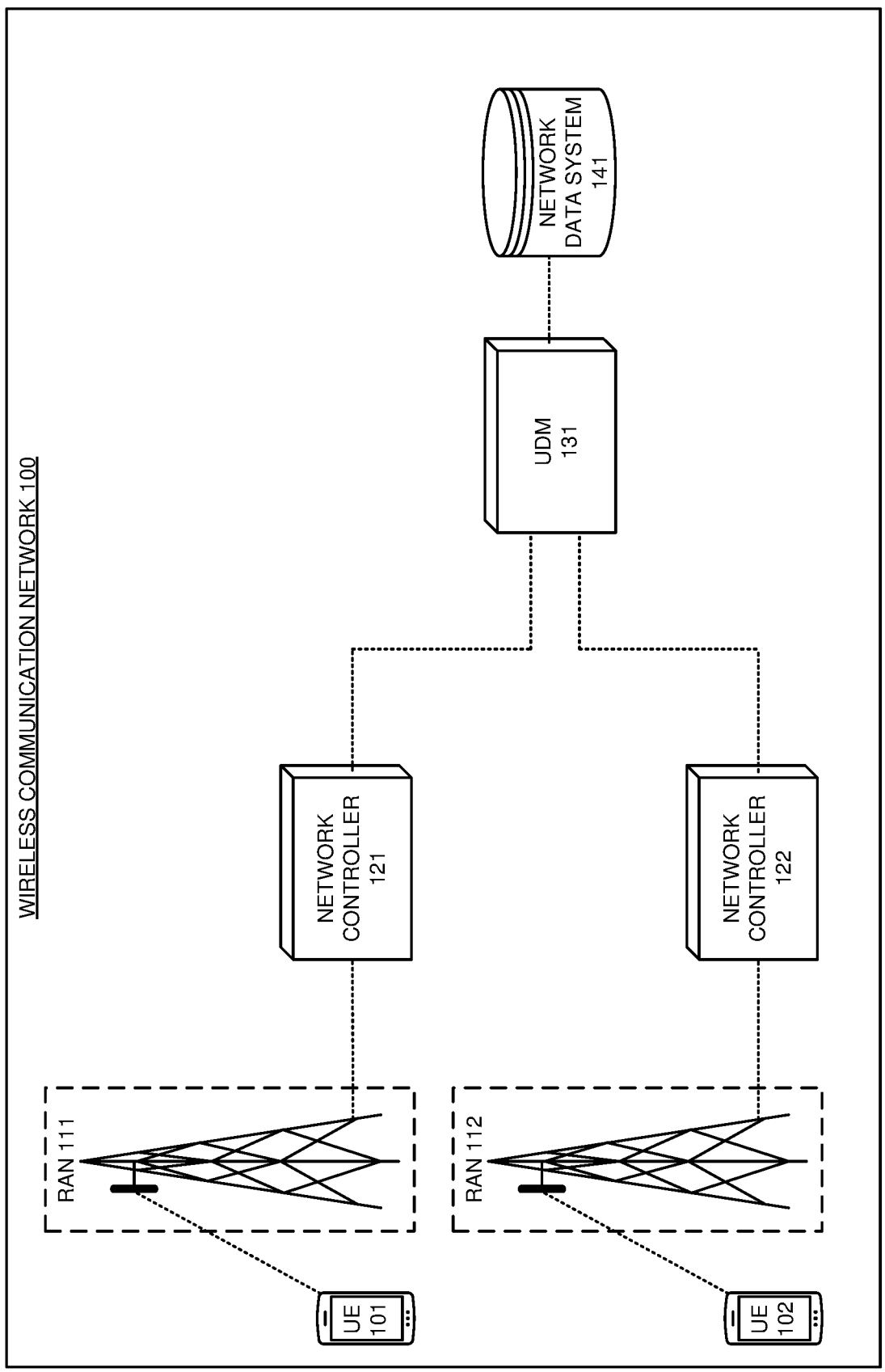
FIG. 1 illustrates a wireless communication network to serve a wireless User Equipment (UE) a wireless data service.

FIG. 1 illustrates wireless communication network 100 to serve wireless User Equipment (UEs) a wireless data service. Wireless communication network 100 delivers services to wireless user devices like internet-access, voice calling, media-streaming, machine communications, or some other wireless communications product. Wireless communication network 100 comprises wireless UEs 101-102, Radio Access Networks (RANs) 111-112, network controllers 121-122, Unified Data Management (UDM) 131, and network data system 141.

Various examples of network operation and configuration are described herein. In some examples, network controller 121 receives a service request from wireless UE 101. Network controller 121 responsively indicates the service request to UDM 131. UDM 131 identifies provisioned service values for wireless UE 101. For example, UDM 131 may query network data system 141 to retrieve provisioned service values for UE 101. UDM 131 retrieves updated service values for wireless UE 101. UDM 131 identifies a set of the provisioned service values that correspond to the updated service values. For example, the updated service values may comprise an updated Quality-of-Service (QoS) value and UDM 131 may identify the provisioned QoS value for UE 101. UDM 131 generates new provisioned service values by overriding the set of the provisioned service values based on the updated service values. For example, UDM 131 may override the provisioned QoS for UE 101 with an updated QoS value. UDM 131 transfers the new provisioned service values to network controller 121. Network controller 121 serves wireless UE 101 based on the new provisioned service values. Advantageously, UDM 131 efficiently retrieves and transfers provisioned service values for wireless UEs 101-102. Moreover, UDM effectively responds to network requirements in wireless communications network 100 by overriding provisioned service values with updated service values.

Wireless UEs 101-102 and RANs 111-112 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. RANs 111-112, network controllers 121-122, UDM 131, and network data system 141 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

Wireless UEs 101-102 comprise computers, phones, vehicles, sensors, robots, or other types of data appliance with wireless and/or wireline communication circuitry. RAN 111-112 are depicted as towers but RANs 111-112 may use other mounting structures or no mounting structures at all. RANs 111-112 comprise Fifth Generation (5G) RANs, LTE RANs, gNodeBs, eNodeBs, NB-IoT access nodes, LP-WAN base stations, wireless relays, WIFI hotspots, access nodes, Bluetooth access nodes, and/or some other type of wireless network transceiver. The wireless user devices and the RANs comprise antennas, amplifiers, filters, modulation, analog/digital interfaces, microprocessors, software, memories, transceivers, bus circuitry, and the like. Network controllers 121-122 comprise network functions like Access and Mobility Management functions (AMFs), Session Management Functions (SMFs), User Plane Functions (UPFs), and the like. Network data system 141 comprises network elements like Uniform Data Registry (UDR), Unstructured Data Storage Function (UDSF), and the like. UEs 101-102, RANs 111-112, network controllers 121-122, UDM 131, and network data system 141 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
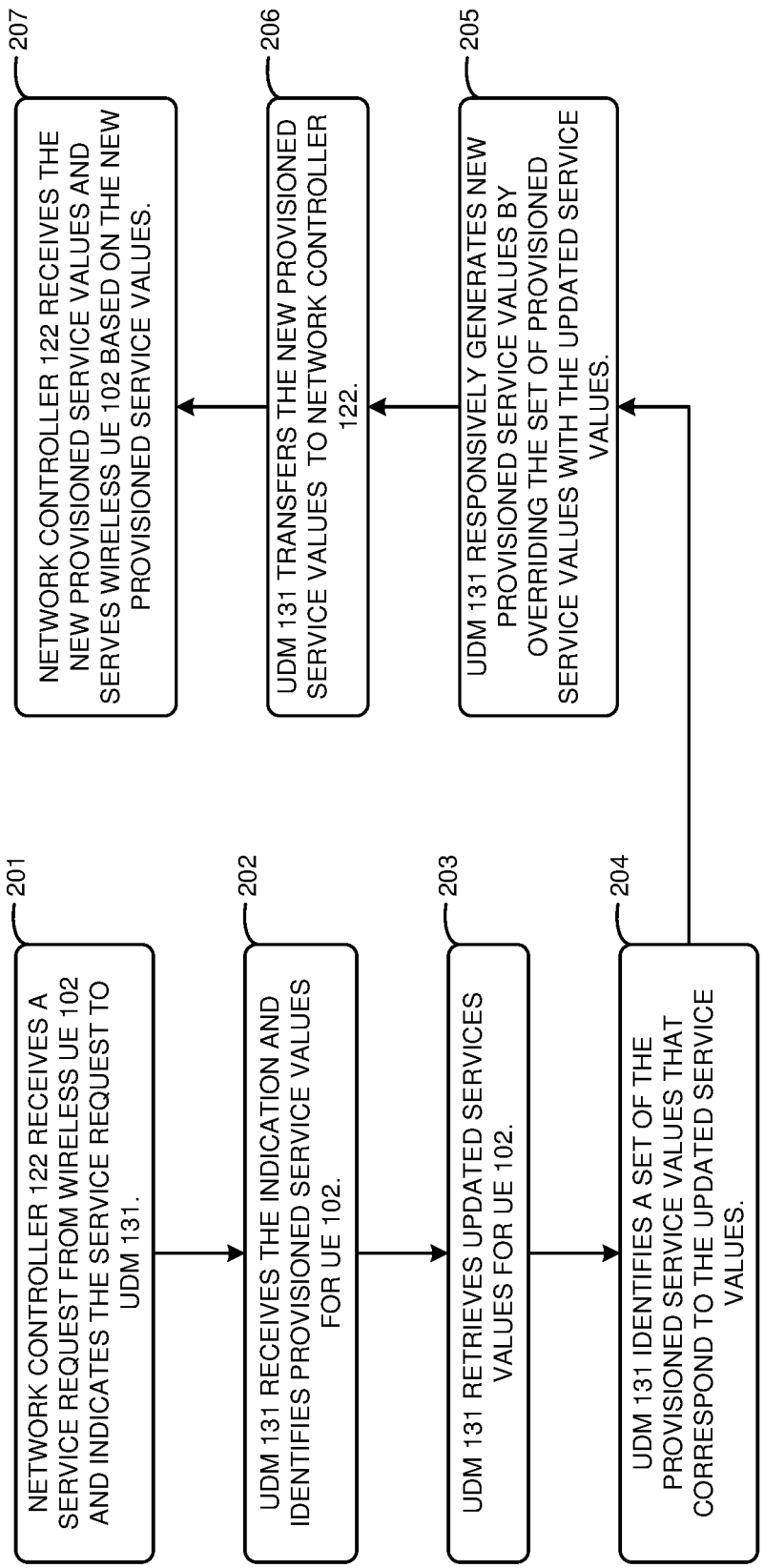
FIG. 2 illustrates an exemplary operation of the wireless communication network to serve a wireless User Equipment (UE) a wireless data service.

FIG. 2 illustrates an exemplary operation of wireless communication network 100 to serve wireless UEs a wireless data service. The operation may vary in other examples. Network controller 122 receives a service request from wireless UE 102 and indicates the service request to UDM 131 (201). UDM 131 receives the indication an identifies provisioned service values for UE 102 (202). UDM 131 retrieves updated service values for UE 102 (203). UDM 131 identifies a set of the provisioned service values that correspond to the updated service values (204). UDM 131 responsively generates new provisioned service values by overriding the set of provisioned service values with the updated service values (205). UDM 131 transfers the new provisioned service values to network controller 122 (206). Network controller 122 receives the new provisioned service values and serves wireless UE 102 based on the new provisioned service values (207).

Figure 3:
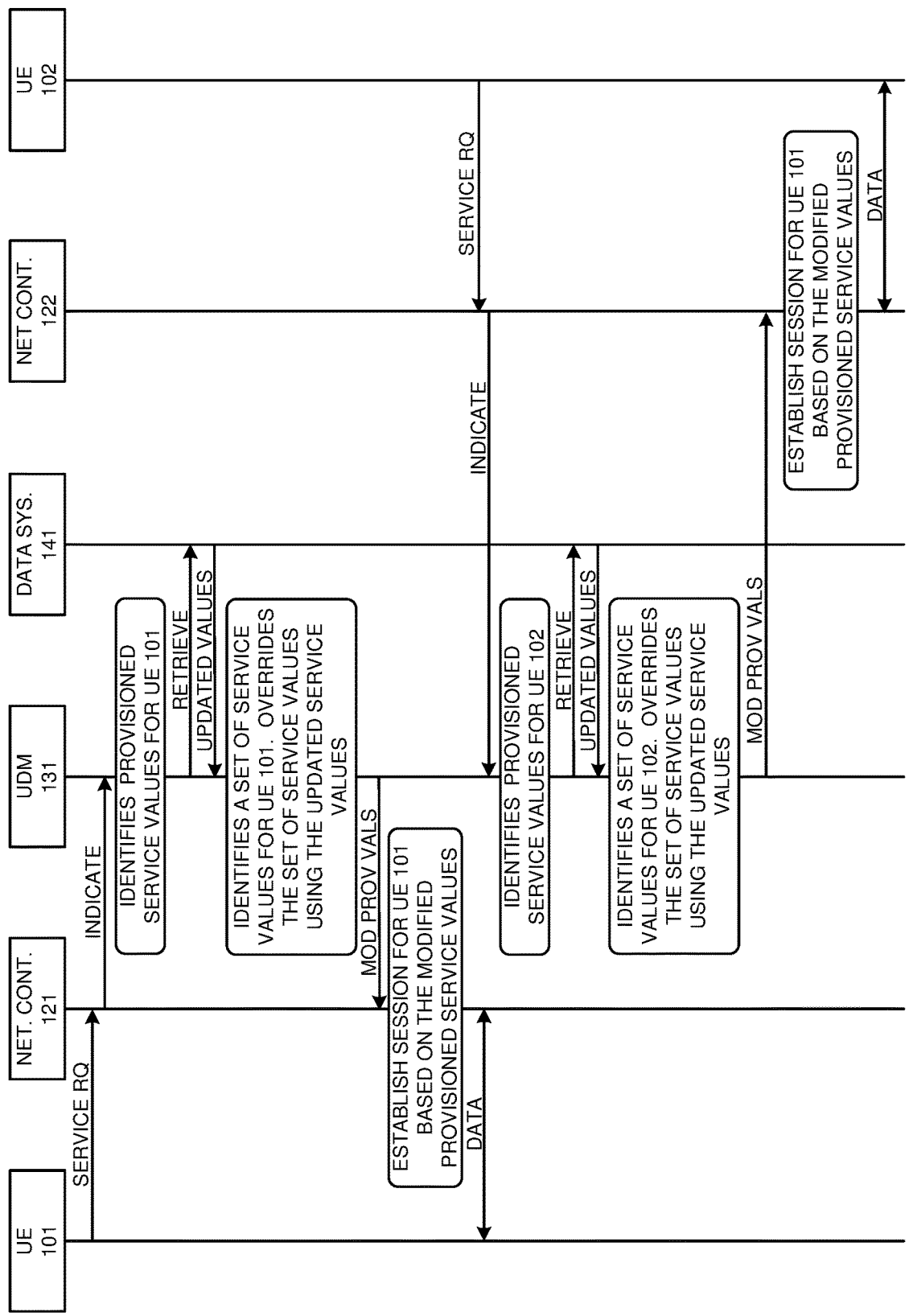
FIG. 3 illustrates another exemplary operation of the wireless communication network to serve a wireless User Equipment (UE) a wireless data service.

FIG. 3 illustrates an exemplary operation of wireless communication network 100 to serve wireless UEs a wireless data service. The operation may vary in other examples. UE 101 wirelessly attaches to network controller 121 over RAN 111. UE 101 wirelessly transfers a service request to network controller 121 over RAN 111. For example, UE 101 may transfer a service request to initiate a Protocol Data Unit (PDU) session to network controller 121. Network controller 121 interacts with UDM 131 and typically other functions to authenticate the identity of UE 101 and forwards the service request to UDM 131. UDM 131 identifies provisioned service values for UE 101. For example, UDM 131 may access a subscriber profile for UE 101 to identify provisioned service values. The provisioned services values indicate Data Network Names (DNNs), Aggregated Maximum Bit Rates (AMBRs), PDU session types, QoS levels, Short Message Service (SMS) attributes, and/or other types of service indicators for UE 401. UDM 131 retrieves updated service values for UE 401 from network data system 141. For example, UDM 131 may identify that UE 101 attached to network controller 121 over RAN 111, and responsively retrieve updated service values for UEs attached to network 100 over RAN 111. Network data system 141 transfers updated service values for UE 101 to UDM 131.

UDM 131 identifies ones of the provisioned service values for UE 101 that correspond to the updated service values. UDM 131 overrides the identified ones of the provisioned service values with the updated service values. For example, the updated service values may indicate an updated AMBR and UDM 131 may replace the provisioned AMBR for UE 401 with the updated AMBR. UDM 131 transfers the modified provisioned service values to network controller 121. Network controller 121 uses to the modified provisioned service values to establish a session for UE 101. Network controller 121 and UE 101 exchange data over RAN 111.

UE 102 wirelessly attaches to network controller 122 over RAN 112. UE 102 wirelessly transfers a service request to network controller 121 over RAN 111. Network controller 121 interacts with UDM 131 and typically other functions to authenticate UE 102 and forwards the service request to UDM 131. UDM 131 identifies provisioned service values for UE 102. UDM 131 retrieves updated service values for UE 402 from network data system 141. For example, UDM 131 may identify that UE 102 attached to network controller 122 over RAN 112, and responsively retrieve updated service values for UEs attached to network 100 over RAN 112. Since UEs 101-102 are attached over different RANs, their updated service values may differ. Network data system 141 transfers updated service values for UE 102 to UDM 131.

UDM 131 identifies ones of the provisioned service values for UE 102 that correspond to the updated service values. UDM 131 overrides the identified ones of the provisioned service values with the updated service values. For example, the updated service values may indicate an updated QoS and UDM 131 may replace the provisioned QoS for UE 402 with the updated QoS. UDM 131 transfers the modified provisioned service values to network controller 122. Network controller 122 uses to the modified provisioned service values to establish a session for UE 102. Network controller 122 and UE 102 exchange data over RAN 112.

Figure 4:
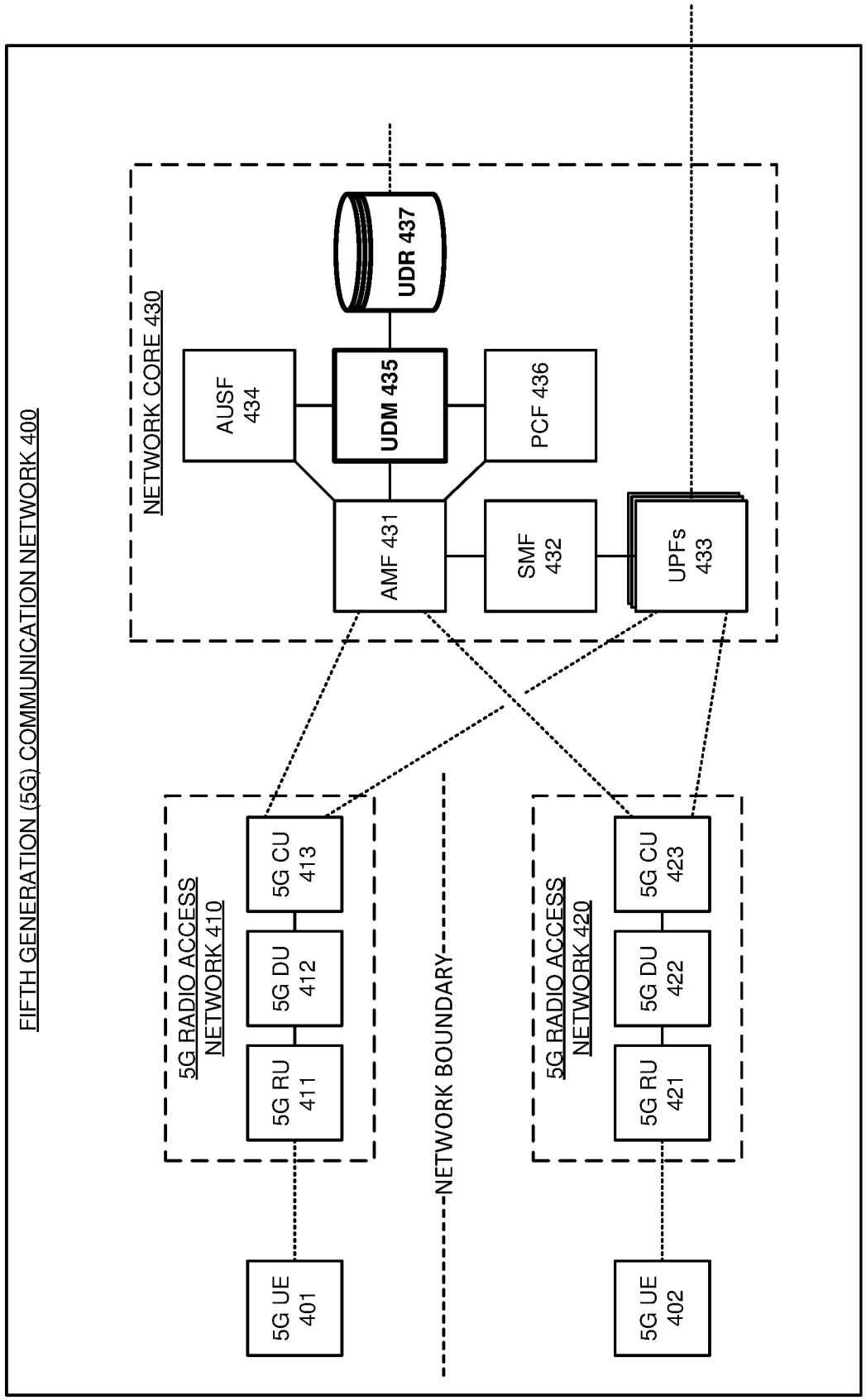
FIG. 4 illustrates a Fifth Generation (5G) communication network to serve a wireless 5G a wireless data service.

FIG. 4 illustrates Fifth Generation (5G) communication network 400 to serve wireless UEs a wireless data service. 5G communication network 400 comprises an example of wireless communication network 100, although network 100 may differ. 5G communication network 400 comprises 5G UEs 401-402, 5G RANs 410 and 420, and 5G network core 430. 5G RAN 410 comprises 5G Radio Unit (RU) 411, 5G Distributed Unit (DU) 412, and 5G Centralized Unit (CU) 413. 5G RAN 420 comprises 5G RU 421, 5G DU 422, and 5G CU 423. 5G network core 430 comprises Access and Mobility Management Function (AMF) 431, Session Management Function (SMF) 432, User Plane Functions (UPFs) 433, Authentication Server Function (AUSF) 434, Uniform Data Management (UDM) 435, Policy Control Function (PCF) 436, and Uniform Data Registry (UDR) 437. RAN 410 and RAN 420 comprise different network regions that are separated by a network boundary. RAN 410 and RAN 420 may comprise different Tracking Areas (TAs), different Public Land Mobile Networks (PLMNs), a home network and a visiting network, and/or some other type of network partition. Other network functions, network elements, and regions are typically present in network core 430 but are omitted for clarity.

UDR 437 receives and stores Slice Dependent Subscriber Profiles (SDSPs) from a network operator. The SDSPs indicate allowed Data Network Names (DNNs), prohibited DNNs, Aggregated Maximum Bit Rates (AMBRs), available Protocol Data Unit (PDU) session types, Quality-of-Service (QoS) attributes, Short Message Service (SMS) attributes, and/or other types of service metrics. The SDSPs correspond to particular PLMN IDs, TAs, roaming networks, slices, particular UEs, and/or other types of network regions. For example, RAN 420 may comprise a PLMN ID and UDR 437 may store a SDSP for the PLMN ID of RAN 420.

UE 401 wirelessly attaches to RU 411 and transfers attachment signaling to CU 413 over RU 411 and DU 412. CU 413 establishes an RRC connection with UE 401. CU 413 transfers a registration request for UE 401 to AMF 431. The registration request indicates a PDU session request and the network region of UE 401. AMF 431 identifies the network region UE 401 is attaching from based on the registration request. From example, AMF 431 may identify the TA of RAN 410 and responsively locate the network region of UE 401. AMF 431 selects AUSF 434 to authenticate UE 401 for wireless services and transfers an authentication request for UE 401 to AUSF 434. AUSF 434 interacts with UDM 435 to authenticate UE 401. AUSF 434 requests authentication keys for UE 401 from UDM 435. UDM 435 transfers authentication keys for UE 401 to AUSF 434. AUSF 434 uses the authentication keys and a random number to generate an expected result for UE 401. AUSF 434 transfers the random number and the expected result for UE 401 to AMF 431. AMF 431 forwards the random number for UE 401 to over RAN 410. UE 401 hashes the random number with its authentication key to generate the same expected result. UE 401 transfers the expected result to AMF 431 over RAN 410. AMF 431 matches the two expected results to authenticate the identity of UE 401.

Responsive to the authentication and authorization, AMF 431 requests UE context for UE 401 from UDM 435 and indicates the network region for UE 401. For example, AMF 431 may indicate the PLMN ID and TA for UE 401 to UDM 435. In response to the context request, UDM 435 retrieves the UE context for UE 401 from UDR 437. The UE context indicates provisioned service attributes for UE 401 like DNNs, QoS values, PDU session types and the like. UDM 435 queries the SDSP for the network region that UE 401 attached to from UDR 437. For example, UDM 435 may identify the PLMN ID for UE 401 and responsively retrieve the SDSP for that PLMN ID from UDM 435. UDM 435 compares the provisioned service values for UE 401 to the SDSP values to identify values that are different. UDM 435 generates modified service values for UE 401 by overriding the provisioned values that are different than the SDSP service values. For example, UDM 435 may implement a data structure and identify the provisioned DNNs for UE 401 are different than the DNNs in the SDSP and responsively override the provisioned DNNs with the SDSP DNNs. UDM 435 transfers the modified service values for UE 401 to AMF 431. AMF 431 receives the modified service values for UE 401. AMF 431 retrieves network policies for UE 401 from PCF 436.

AMF 431 selects SMF 432 to establish the PDU session for UE 401 based on the modified service values and the network policies. AMF 431 transfers the modified service values to SMF 432. SMF 432 uses the modified service values to select a UPF from UPFs 433 to establish the PDU session for UE 401. For example, SMF 432 may identify a UPF that has connectivity to the DNN indicated by the modified service values. SMF 432 directs the selected UPF to establish the PDU session for UE 401. SMF 432 generates and transfers session context that indicates the selected UPF to AMF 431. AMF 431 transfers the session context to CU 413. CU 413 transfers the session context to UE 401 over DU 412 and RU 411. UE 401 initiates the PDU session and wirelessly exchanges user data with the selected one of UPFs 433 over RAN 410.

In a similar manner as UE 401, UE 402 wirelessly attaches to RU 421 and transfers attachment signaling to CU 423 over RU 421 and DU 422. CU 423 establishes an RRC connection with UE 402. CU 423 transfers a registration request for UE 402 that indicates a PDU session request and the network region of UE 402 to AMF 431. AMF 431 identifies the network region UE 402 is attaching from based on the registration request. AMF 431 selects AUSF 434 to authenticate UE 402 for wireless services and transfers an authentication request for UE 402. AUSF 434 selects UDM 435 and requests authentication keys for UE 402 from UDM 435. UDM 435 transfers authentication keys for UE 402 to AUSF 434. AUSF 434 uses the authentication keys and a random number to generate an expected result. AUSF 434 transfers the random number and the expected result for UE 402 to AMF 431. AMF 431 forwards the random number to UE 402 over RAN 420. UE 402 hashes the random number with its authentication key to generate the same expected result. UE 402 transfers the expected result to AMF 431 over RAN 420. AMF 431 matches the two expected results to authenticate the identity of UE 402.

Responsive to the authentication and authorization, AMF 431 requests UE context for UE 402 from UDM 435 and indicates the network region for UE 402. In response to the context request, UDM 435 retrieves the UE context for UE 402 from UDR 437. UDM 435 queries UDR 437 for the SDSP for the network region that UE 402 attached to. Note that because UE 402 is attached in a different network region than UE 401, the SDSP profile used to update the provisioned service values for UE 402 is different. For example, UE 402 may be in a different TA than UE 401. UDM 435 compares the provisioned service values for UE 402 to the SDSP values. UDM 435 generates modified service values for UE 402 by overriding ones of the provisioned values with the SDSP service values. UDM 435 transfers the modified service values for UE 402 to AMF 431. AMF 431 receives the modified service values for UE 402 and retrieves network policies for UE 402 from PCF 436.

AMF 431 selects SMF 432 to establish the PDU session for UE 402 based on the modified service values and the network policies. AMF 431 transfers the modified service values to SMF 432. SMF 432 uses the modified service values to select a UPF from UPFs 433 to establish the PDU session for UE 402. For example, SMF 432 may identify a UPF that can support the AMBR indicated by the modified service values. SMF 432 directs the selected UPF to establish the PDU session for UE 402. SMF 432 generates and transfers session context that indicates the selected UPF to AMF 431. AMF 431 transfers the session context to CU 423. CU 423 transfers the session context to UE 402 over DU 422 and RU 421. UE 402 initiates the PDU session and wirelessly exchanges user data with the selected one of UPFs 433 over RAN 420.

Figure 5:
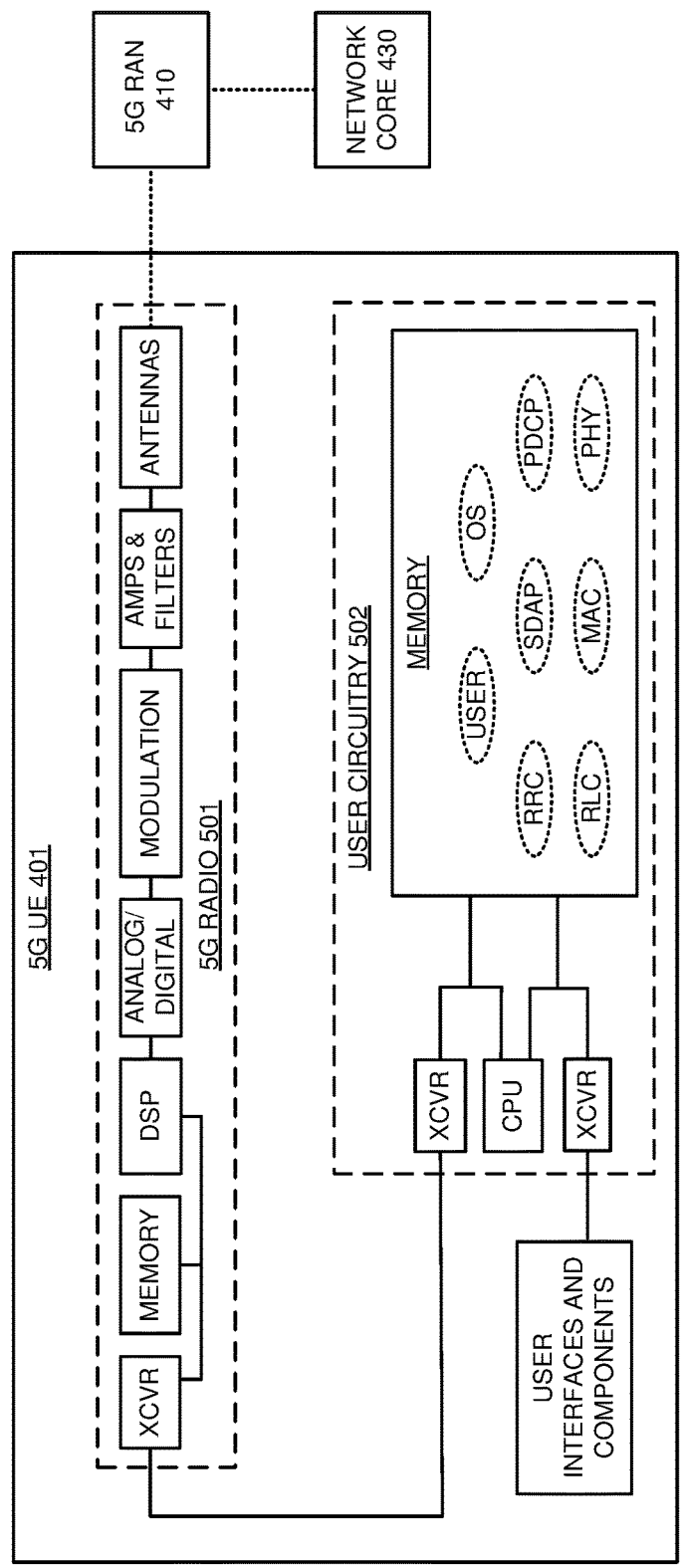
FIG. 5 illustrates a 5G UE in the 5G communication network.

FIG. 5 illustrates 5G UE 401 in 5G communication network 400. UE 401 comprises an example of the wireless UEs 101-102 illustrated in FIG. 1, although UEs 101-102 may differ. UE 401 comprises 5G radio 501 and user circuitry 502. UE 402 may be similar to UE 401 however UE 402 may differ. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 410 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
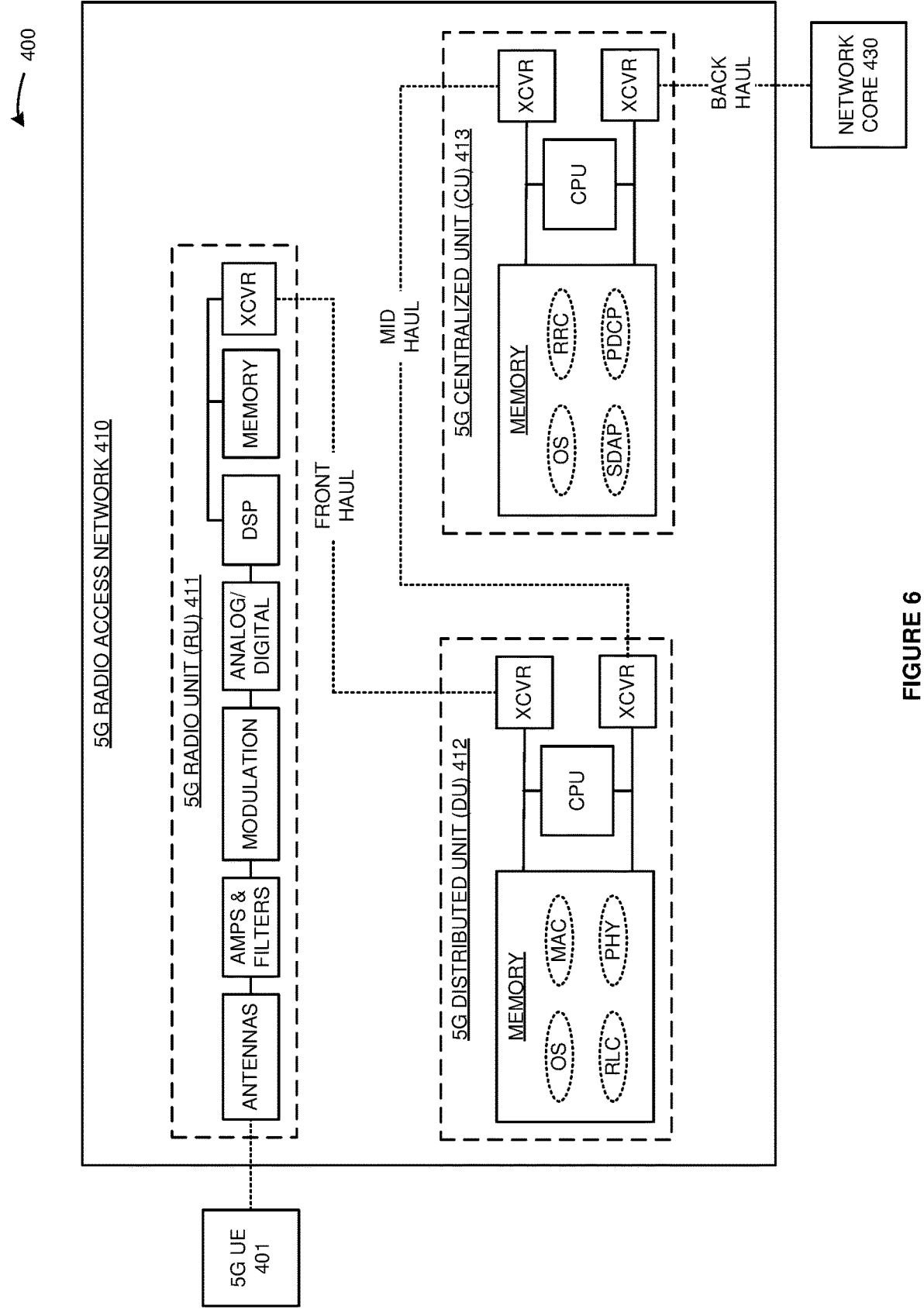
FIG. 6 illustrates a 5G RAN in the 5G communication network.

FIG. 6 illustrates 5G RU 411, 5G DU 412, and 5G CU 413 in 5G communication network 400. RU 411, DU 412, and CU 413 comprise an example of RAN 111-112, although RANs 111-112 may differ. 5G RU 421, 5G DU 422, and 5G CU 423 may be similar to 5G RU 411, 5G DU 412, and 5G CU 413. RU 411 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over 5GNR links. Transceivers in 5G RU 411 are coupled to transceivers in 5G DU 412 over fronthaul links like enhanced Common Public Radio Interface (eCPRI). The DSP in RU 411 executes its operating systems and radio applications to exchange 5GNR signals with UE 401 and to exchange 5GNR data units with DU 412.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 store an operating system and 5GNR network applications like PDCP, SDAP, and RRC. Transceivers in 5G DU 412 are coupled to transceivers in RUs 411 over front-haul links. Transceivers in DUs 412 are coupled to transceivers in CUs 413 over mid-haul links. A transceiver in CU 413 is coupled to network core 430 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
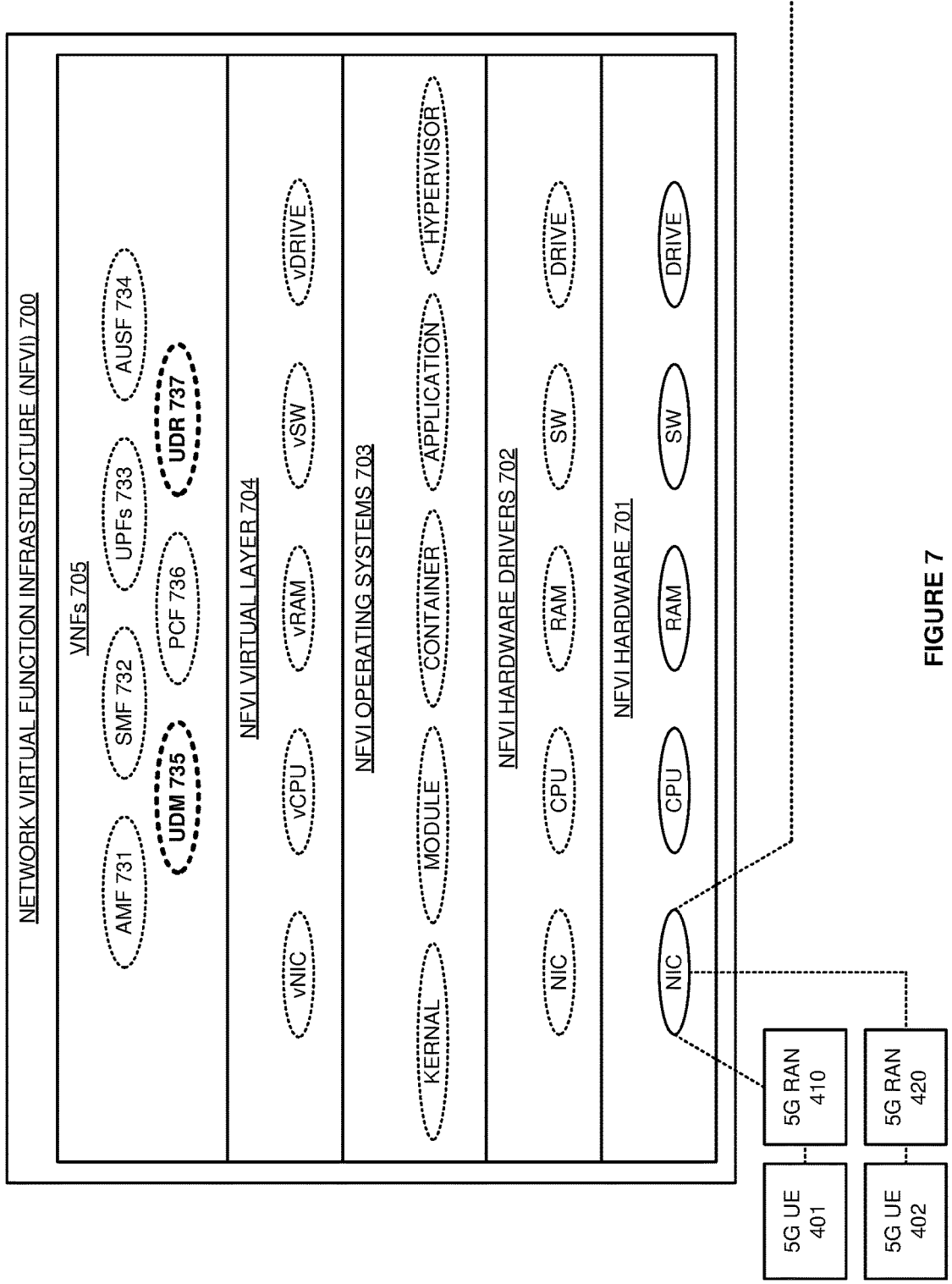
FIG. 7 illustrates a Network Function Virtualization Infrastructure (NFVI) in the 5G communication network.

FIG. 7 illustrates Network Function Virtualization Infrastructure (NFVI) 700 in 5G communications network 400. NFVI 700 comprises an example of network controller 121, UDM 131, and network data system 141, although network controller 121, UDM 131, and network data system 141 may vary from this example. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 731, SMF 732, UPFs 733, AUSF 724, UDM 735, PCF 736, and UDR 737. Additional VNFs and network elements like Network Slice Selection Function (NSSF) and Network Exposure Function (NEF) are typically present but are omitted for clarity. NFVI 700 may be located at a single site or be distributed across multiple geographic locations. The NIC in NFVI hardware 701 is coupled to 5G RANs 410 and 420 and to external systems. NFVI hardware 701 executes NFVI hardware drivers 702, NFVI operating systems 703, NFVI virtual layer 704, and NFVI VNFs 705 to form AMF 431, SMF 432, UPFs 433, AUSF 424, UDM 435, PCF 436, and UDR 437.

Figure 8:
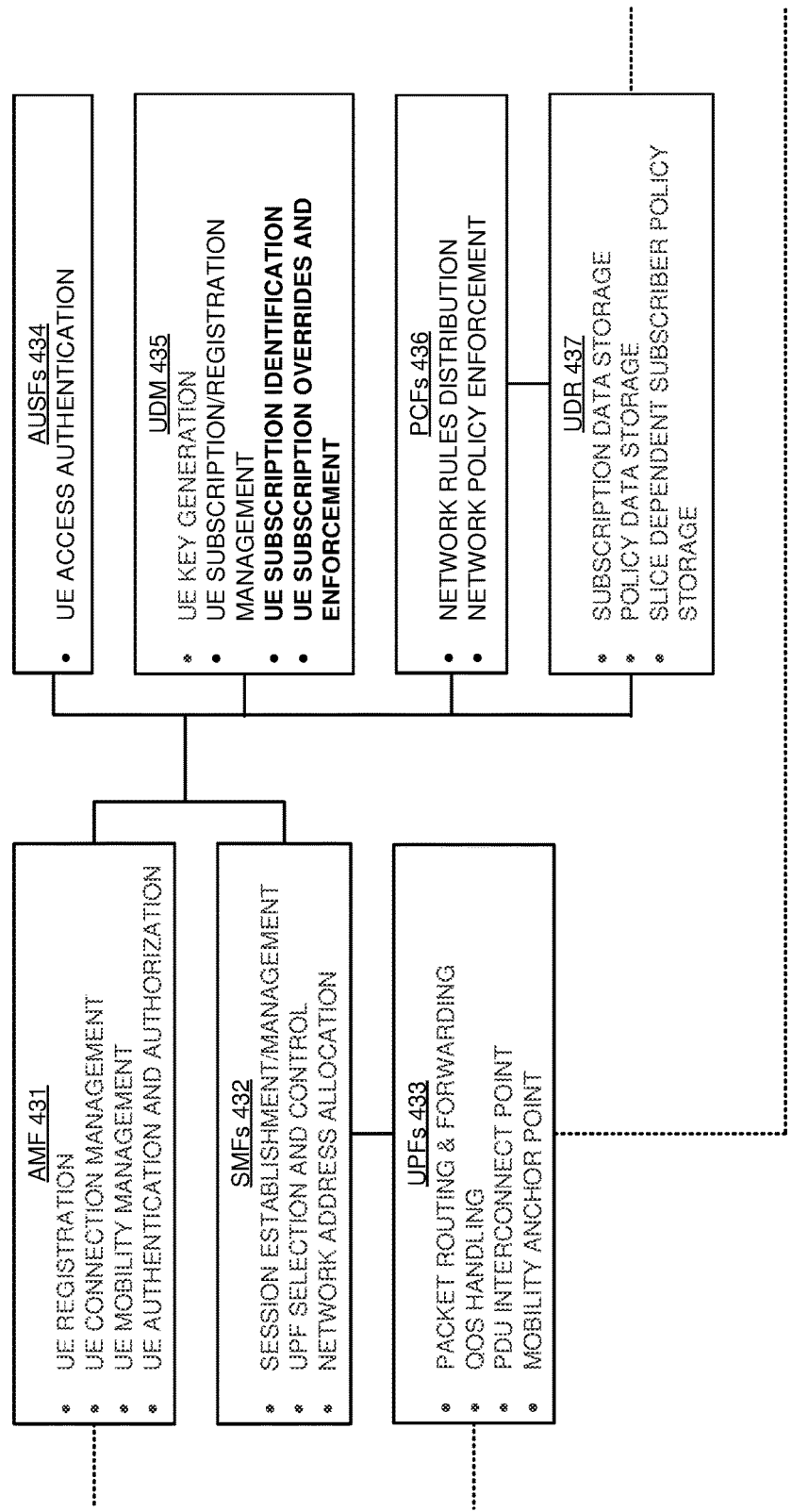
FIG. 8 further illustrates the NFVI in the 5G communication network.

FIG. 8 further illustrates NFVI 700 in 5G communication network 400. AMF 431 performs UE registration and connection, UE connection/mobility management, and UE authentication and authorization. SMF 432 performs session establishment and management, UPF selection and control, and network address allocation. UPFs 433 perform packet routing & forwarding, QoS handling, PDU interconnection, and mobility anchoring. AUSF 434 performs LIE access authentication. UDM 435 performs UE key generation, UE subscription and registration management, UE subscription identification, and UE subscription overrides and enforcement PCF 436 performs network rules management and distribution and network policy enforcement. UDR 437 performs subscription data storage, policy data storage, and Slice Dependent Subscriber Profile (SDSP) storage.

In this example, UDM 435 overrides provisioned DNN values for UE 401 based on the PLMN UE 401 attached to, however the operation may differ in other examples. UDR 437 receives and SDSPs for the PLMN ID of RAN 410 and the PLMN ID of RAN 420 from a network operator. For example, the PLMN ID for RAN 410 may be from a non-preferred carrier is unable to support the provisioned service values for certain UEs that attach to the PLMN ID. The SDSP for the PLMN ID of RAN 410 indicates available DNNs, prohibited DNNs, AMBRs values, PDU session types, QoS, and SMS attributes for UEs that attach to that PLMN ID. The SDSP for the PLMN ID of RAN 420 indicates available DNNs, prohibited DNNs, AMBRs values, PDU session types, QoS, and SMS attributes for UEs that attach to that PLMN ID.

UE 401 wirelessly attaches RAN 410. AMF 431 receives a registration request for UE 401 from RAN 410. The registration request indicates the PLMN ID UE 401 attached to over RAN 410. AMF 431 identifies the PLMN ID of UE 401 based on the registration request. AMF 431 transfers an authentication request for UE 401 to AUSF 434. AUSF 434 requests authentication keys for UE 401 from UDM 435. UDM 435 transfers authentication keys for UE 401 to AUSF 434. AUSF 434 uses the authentication keys and a random number to generate an expected result for UE 401. AUSF 434 transfers the random number and the expected result for UE 401 to AMF 431. AMF 431 forwards the random number for UE 401 to over RAN 410. UE 401 hashes the random number with its authentication key to generate the same expected result. UE 401 transfers the expected result to AMF 431 over RAN 410. AMF 431 matches the two expected results to authenticate the identity of UE 401.

Responsive to the authentication and authorization, AMF 431 transfers a context request for UE 401 and indicates the PLMN ID for UE 401 to UDM 435. UDM 435 retrieves the UE context from UDR 437 that indicates provisioned DNNs, QoS values, PDU session types and the like for UE 401. UDM 435 queries UDR 437 for the SDSP for the PLMN ID that UE 401 attached to from UDR 437. UDR 437 responsively transfers the SDSP for the PLMN ID to UDM 435. UDM 435 compares the provisioned service values for UE 401 to the SDSP values and identifies that the provisioned DNNs are different than the DNNs indicated by the SDSP. UDM 435 modifies the UE context to indicate the SDSP DNNs and to remove the provisioned DNNs. UDM 435 transfers the modified UE context to AMF 431. AMF 431 receives the modified UE context. AMF 431 retrieves network policies for UE 401 from PCF 436.

AMF 431 selects SMF 432 to establish a PDU session for UE 401 based on the modified UE context and the network policies. AMF 431 indicates the modified UE context to SMF 432. SMF 432 identifies a UPF of UPFs 433 that has connectivity to the DNNs in the modified UE context. SMF 432 directs the identified UPF to establish the PDU session for UE 401. SMF 432 generates and transfers session context that indicates the selected UPF to AMF 431. AMF 431 transfers the session context to UE 401 over RAN 410. UE 401 wirelessly exchanges user data with the selected one of UPFs 433 over RAN 410. The selected one of UPFs 433 exchanges user data with external data networks.

Figure 9:
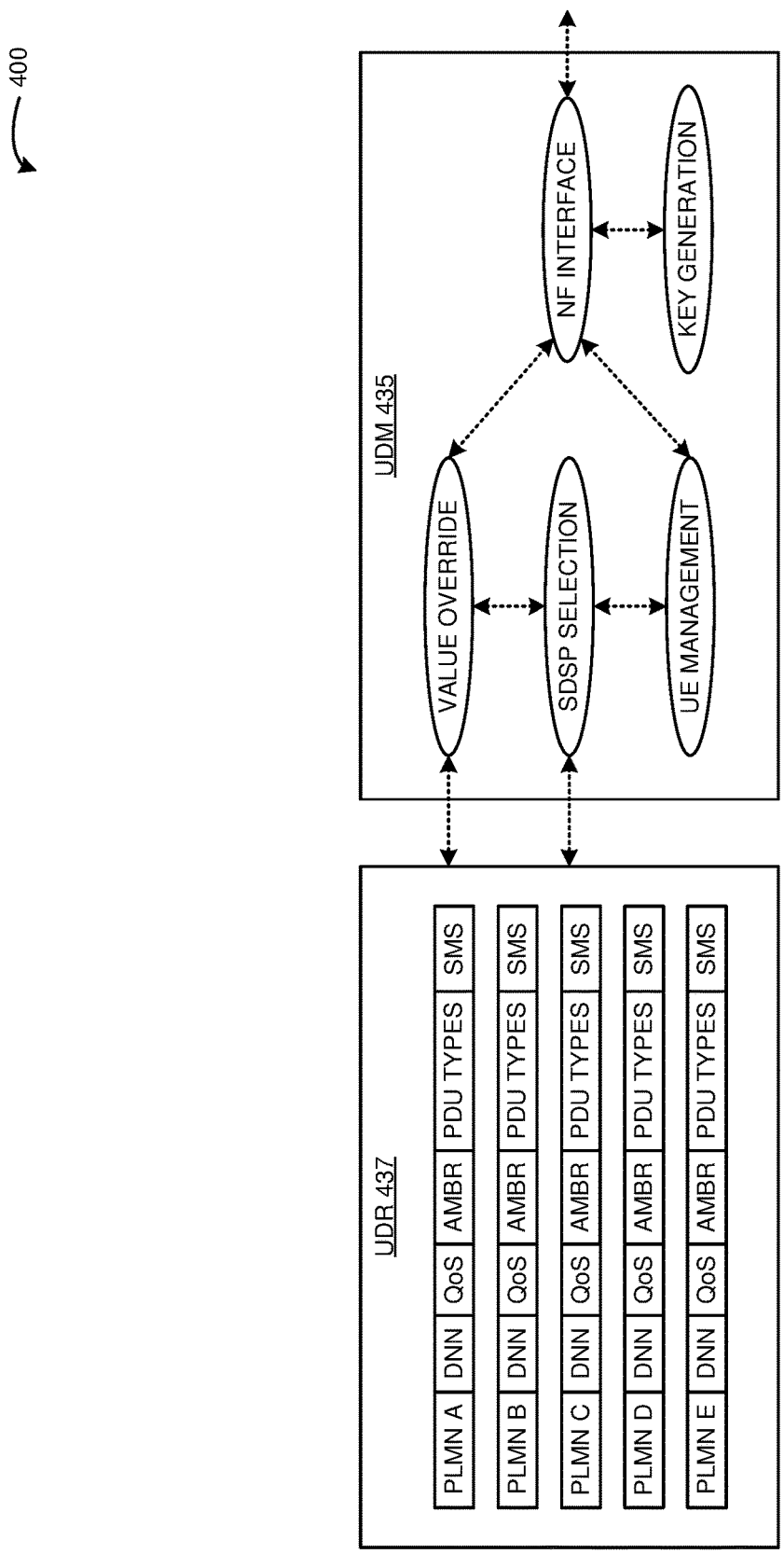
FIG. 9 illustrates a Unified Data Management (UDM) and a Unified Data Registry (UDR) in the 5G communication network.

FIG. 9 illustrates UDM 435 and UDR 437 in 5G communication network 400. UDM 435 comprises an example of UDM 131, although UDM 131 may differ. UDR 437 comprises an example of network data system 141, although network data system 141 may differ. UDR 437 stores SDSPs for PLMNs A-E. The SDSPs indicate DNNs, QoS, AMRs, PDU session types, and SMS attributes for PLMNs A-E. In some examples, the SDSPs may be grouped by roaming network type, Tracking Area (TA), network region, and/or some other type of network partition. UDM 435 comprises Network Function (NF) interface components that interact with other network functions to exchange network data like UE context. UDM 435 comprises key generation components that generate secret keys to authenticate UEs 401-402. UDM 435 comprises UE management components to retrieve UE context for users. UDM 435 comprises SDSP selection components and value override components to retrieve the SDSP for the UE and override provisioned service values based on the SDSPs.

Figure 10:
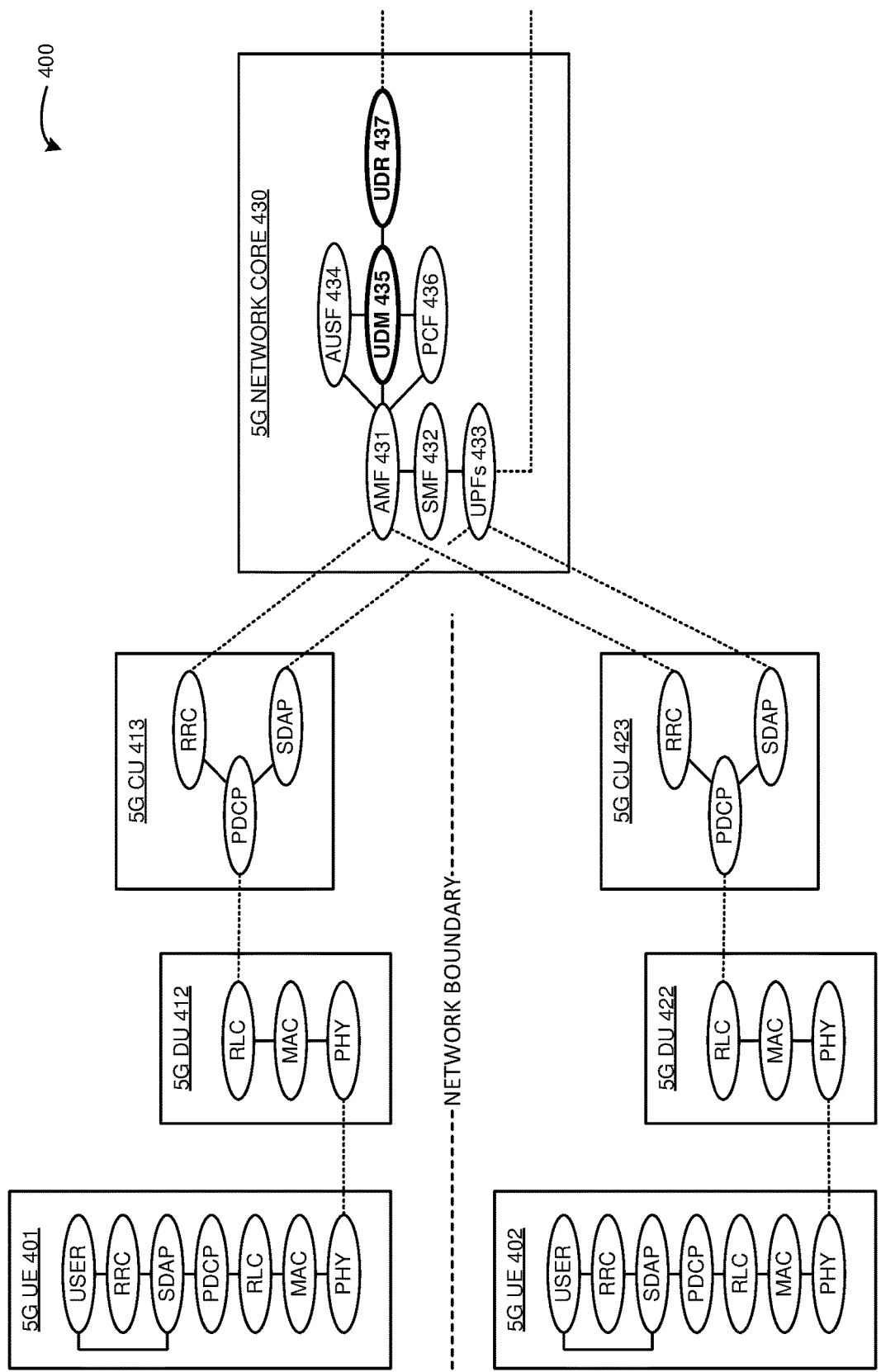
FIG. 10 illustrates an exemplary operation of the 5G communication network to serve a wireless UE a wireless data service.

FIG. 10 illustrates an exemplary operation of the 5G communication network to serve wireless UEs a wireless data service. The operation may vary in other examples. In this example, UDM 435 overrides provisioned QoS and AMBR values for UE 402 based on the TA of UE 402, however the operation may differ in other examples.

In response to a network event in the TA of RAN 420, a network operator transfers an SDSP with modified QoS and AMBR for that TA to UDR 437. For example, the TA of RAN 420 may be experiencing higher-than-average usage and the network operator may configured the SDSP for the TA to accommodate the higher-than-average usage. UDR 437 receives and stores the SDSP from the network operator.

A user application (USER) in UE 402 executes and the RRC in UE 402 wirelessly attaches to the RRC in CU 423 over the PDCPs, RLCs, MACs, and PHYs. The RRC in CU 423 establishes an RRC connection with the RRC in UE 402. The RRC in CU 423 transfers a registration request for UE 402 to AMF 431. The registration request indicates the TA that UE 402 attached to the network over. AMF 431 identifies the TA for UE 402 based on the registration request. AMF 431 transfers an authentication request for UE 402 to AUSF. AUSF 434 interacts with UDM 435 to retrieve authentication keys for UE 402. AUSF 434 uses the authentication keys and a random number to generate an expected result. AUSF 434 transfers the random number and the expected result for UE 402 to AMF 431. AMF 431 forwards the random number to the RRC in CU 423. The RRC in CU 423 transfers the random number to the RRC in UE 402 over the PDCPs, RLCs, MACs, and PHYs. The RRC in UE 402 hashes the random number to generate the same expected result. The RRC in UE 402 transfers the expected result to the RRC in CU 423 over the PDCPs, RLCs, MACs, and PHYs. The RRC in CU 423 transfers the expected result to AMF 431 over RAN 420. AMF 431 matches the two expected results to authenticate the identity of UE 402.

Responsive to the authentication and authorization, AMF 431 transfers a context request to UDM 435. The context request indicates the TA of UE 402. In response to the context request, UDM 435 retrieves UE context for UE 402 from UDR 437. UDM 435 queries UDR 437 for the SDSP for the TA of RAN 420. UDR 437 transfers the SDSP for the TA to UDM 435. UDM 435 determines that the SDSP indicates QoS values and an AMBR for the TA. UDM 435 overrides the provisioned QoS values and AMBR for UE 402 using the QoS values and AMBR from the SDSP. UDM 435 transfers UE context that indicates the updated QoS values and AMBR for UE 402 to AMF 431. AMF 431 receives the UE context from UDM 435 and retrieves network policies for UE 402 from PCF 436.

AMF 431 selects SMF 432 to establish the PDU session for UE 402 based on the UE context and the network policies. AMF 431 transfers the UE context to SMF 432. SMF 432 selects a UPF from UPFs 433 that can support the modified QoS values and AMBR. SMF 432 generates and transfers session context that indicates the selected UPF to AMF 431. AMF 431 transfers the session context to the RRC in CU 423. The RRC in CU 423 transfers the session context to the RRC in UE 402 over the PDCPs, RLCs, MACs, and PHYs. The RRC in UE 402 initiates the PDU session and directs the SDAP in UE 402 to begin the PDU session. The SDAP in UE 402 exchanges user data with the SDAP in CU 423 over the PDCPs, RLCs, MACs, and PHYs and at the indicated QoS level and AMBR. The SDAP in CU 423 exchanges the user data with the selected one of UPFs 433. The selected one of UPFs 433 exchanges user date with external systems.

The wireless data network circuitry described above comprises computer hardware and software that form special-purpose network circuitry to direct another wireless communication network to serve wireless UEs a wireless data service. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve the wireless UEs the wireless data service.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless data service to a wireless User Equipment (UE), the method comprising:
a network controller receiving a service request from the wireless UE and responsively indicating the service request to a Unified Data Management (UDM);
the UDM receiving the indication, identifying provisioned service values for the wireless UE, querying a Slice Dependent Subscriber Profile (SDSP) that indicates updated service values for the wireless UE from a Uniform Data Registry (UDR), retrieving the updated service values for the wireless UE, identifying a set of the provisioned service values that correspond to the updated service values, generating new provisioned service values by overriding the set of the provisioned service values based on the updated service values, and transferring the new provisioned service values to the network controller; and
the network controller receiving the new provisioned service values and serving the wireless UE based on the new provisioned service values.

2. The method of claim 1 wherein:
the UDM identifying the provisioned service values for the wireless UE comprises the UDM determining a Public Land Mobile Network Identifier (PLMN ID) for the wireless UE; and
the UDM identifying the set of provisioned service values comprises selecting the updated service values for the wireless UE based on the PLMN ID.

3. The method of claim 1 wherein:
the UDM identifying the provisioned service values for the wireless UE comprises the UDM determining a visiting network Identifier (ID) for the wireless UE; and
the UDM identifying the set of provisioned service values comprises selecting the updated service values for the wireless UE based on the visiting network ID.

4. The method of claim 1 wherein:
the UDM identifying the provisioned service values for the wireless UE comprises the UDM determining a Tracking Area (TA) for the wireless UE; and
the UDM identifying the set of provisioned service values comprises selecting the updated service values for the wireless UE based on the TA.

5. The method of claim 1 wherein the UDM generating the new provisioned service values by overriding the set of the provisioned service values based on the updated service values comprises the UDM updating Quality-of-Service (QoS) values in the set of provisioned service values.

6. The method of claim 1 wherein the UDM generating the new provisioned service values by overriding the set of the provisioned service values based on the updated service values comprises the UDM updating Data Network Name (DNN) values in the set of provisioned service values.

7. The method of claim 1 wherein the UDM generating the new provisioned service values by overriding the set of the provisioned service values based on the updated service values comprises the UDM updating Aggregated Maximum Bit Rate (AMBR) values in the set of provisioned service values.

8. The method of claim 1 wherein the UDM generating the new provisioned service values by overriding the set of the provisioned service values based on the updated service values comprises the UDM updating Protocol Data Unit (PDU) session types in the set of provisioned service values.

9. The method of claim 1 wherein the network controller comprises an Access and Mobility Management Function (AMF).

10. The method of claim 1 wherein
the network controller comprises an Access and Mobility Management Function (AMF); and
the network controller serving the wireless UE based on the new provisioned service values comprises the AMF selecting a Session Management Function (SMF) based on the new provisioned service values and transferring the new provisioned service values to the SMF wherein the SMF uses the new provisioned service values to select a User Plane Function (UPF) to serve the wireless UE.

11. A wireless communication network to serve a wireless data service to a wireless User Equipment (UE), the wireless communication network comprising:
a network controller configured to receive a service request from the wireless UE and responsively indicate the service request to a Unified Data Management (UDM);
the UDM configured to receive the indication, identify provisioned service values for the wireless UE, query a Slice Dependent Subscriber Profile (SDSP) that indicates sets of updated service values for the wireless UE from a Uniform Data Registry (UDR), retrieve the updated service values for the wireless UE, identify a set of the provisioned service values that correspond to the updated service values, generate new provisioned service values by overriding the set of the provisioned service values based on the updated service values, and transfer the new provisioned service values to the network controller; and
the network controller configured to receive the new provisioned service values and serve the wireless UE based on the new provisioned service values.

12. The wireless communication network of claim 11 wherein:
the UDM is configured to identify the provisioned service values for the wireless UE comprises the UDM configured to determine a Public Land Mobile Network Identifier (PLMN ID) for the wireless UE; and
the UDM is configured to identify the set of the provisioned service values comprises the UDM configured to select the updated service values for the wireless UE based on the PLMN ID.

13. The wireless communication network of claim 11 wherein:
the UDM is configured to identify the provisioned service values for the wireless UE comprises the UDM configured to determine a visiting network Identifier (ID) for the wireless UE; and
the UDM is configured to identify the set of the provisioned service values comprises the UDM configured to select the updated service values for the wireless UE based on the visiting network ID.

14. The wireless communication network of claim 11 wherein:
the UDM is configured to identify the provisioned service values for the wireless UE comprises the UDM configured to determine a Tracking Area (TA) for the wireless UE; and the UDM is configured to identify the set of the provisioned service values comprises the UDM configured to select the updated service values for the wireless UE based on the TA.

15. The wireless communication network of claim 11 wherein the UDM is configured to generate the new provisioned service values by overriding the set of the provisioned service values based on the updated service values comprises the UDM configured to update Quality-of-Service (QoS) values in the set of provisioned service values.

16. The wireless communication network of claim 11 wherein the UDM is configured to generate the new provisioned service values by overriding the set of the provisioned service values based on the updated service values comprises the UDM configured to update Data Network Name (DNN) values in the set of provisioned service values.

17. The wireless communication network of claim 11 wherein the UDM is configured to generate the new provisioned service values by overriding the set of the provisioned service values based on the updated service values comprises the UDM configured to update Aggregated Maximum Bit Rate (AMBR) values in the set of provisioned service values.

18. The wireless communication network of claim 11 wherein the UDM is configured to generate the new provisioned service values by overriding the set of the provisioned service values based on the updated service values comprises the UDM configured to update Protocol Data Unit (PDU) session types in the set of provisioned service values.

19. The wireless communication network of claim 11 wherein the network controller comprises an Access and Mobility Management Function (AMF).

20. The wireless communication network of claim 11 wherein
the network controller comprises an Access and Mobility Management Function (AMF); and
the network controller is configured to serve the wireless UE based on the new provisioned service values comprises the AMF configured to select a Session Management Function (SMF) based on the new provisioned service values and transfer the new provisioned service values to the SMF wherein the SMF uses the new provisioned service values to select a User Plane Function (UPF) to serve the wireless UE.

* * * * *